United States Patent Office 3,592,946
Patented July 13, 1971

3,592,946
FLEXIBLE AMINE-EPOXIDE RESIN AND THE CONTROLLED TEMPERATURE PREPARATION THEREOF
James R. Griffith, Riverdale Heights, Md., assignor to the United States of America as represented by the Secretary of the Navy
No Drawing. Filed Mar. 5, 1968, Ser. No. 710,622
Int. Cl. C03g 30/04
U.S. Cl. 260—47EP        5 Claims

ABSTRACT OF THE DISCLOSURE

An elastomeric solid amine-epoxide resin is prepared from N,N'-dimethylethylenediamine and resorcinol diglycidyl ether. Preparation of the elastomeric resin involves mixing the diamine and diglycidyl ether in proportions to provide an amine hydrogen atom for each epoxy group of the diglycidyl ether, cooling the mixture before vigorous reaction takes place to cause it to be at a temperature of about 5° C., holding the mixture at such a temperature for about 5 hours, and subjecting the resulting partially reacted mixture to heat at room temperature to form a viscous liquid amine-epoxide resin. The viscous liquid resin is cured by heating at an elevated temperature to provide the elastomeric solid resin which is useful as an adhesive, a coating, or as a casting resin.

---

This invention relates to resinous compositions. More and used by or for the Government of the United States of America for governmental purposes without the payment of any royalty thereon or therefor.

This invention relates to resinous compositions. More particularly it relates to new amine-epoxide resins which are useful as adhesives, protective coatings, potting compositions, casting resins and the like.

BACKGROUND OF INVENTION

A number of solid amine-epoxide resins have been heretofore prepared. However, to the present it has not been known to produce an inherently flexible, solid amine-epoxide resin from mixtures of a dihydricphenol polyglycidyl ether and a polyamine.

It is an object of the present invention to provide a new heat curable amine-epoxide resin.

It is also an object to provide an inherently flexible, i.e., elastomeric, solid amine-epoxide resin.

It is a further object to provide a method of preparing the aforesaid new amine-epoxide resins.

STATEMENT OF INVENTION

The above and other objects are accomplished by the present invention in which N,N'-dimethylethylenediamine and resorcinol diglycidyl ether are mixed in proportions to provide an amino hydrogen atom for each epoxy group of the diglycidyl ether and the mixture allowed to react under controlled temperature conditions to form a viscous liquid amine-epoxide resin which is curable by heat at elevated temperatures to an elastomeric solid amine-epoxide resin.

Mixed at room temperature in equimolar proportions, N,N'-dimethylethylenediamine and resorcinol diglycidyl ether react vigorously with a high exotherm after a delay period of about 8 to 10 minutes. The reaction is rapid and quickly culminates in a charred reaction mass. The onset of vigorous reaction is signaled by the appearance of a bubble or bubbles at the surface of the mixture.

I have found that a viscous liquid amine-epoxide resin which is curable by heat at elevated temperatures to an elastomeric solid is obtained by mixing N,N'-dimethylethylenediamine and resorcinol diglycidyl ether in equimolar proportions, cooling the mixture before vigorous reaction takes place therein to cause it to be at a temperature of about 5° C., holding the mixture at such a temperature for about 5 hours and warming the resulting partially reacted mixture to room temperature. At a temperature of 5° C. for the mixture a holding time of 5 hours will allow sufficient reaction to take place in the mixture that on warming it to room temperature reaction therein will proceed quietly.

Mixing of the N,N'-dimethylethylenediamine and resorcinol diglycidyl ether may be accomplished by stirring them together at room temperature for a short period of time, about 2 to 3 minutes. The mixture is then directly subjected to the deep cooling to obtain the desired low temperature, quiet reaction condition therein.

A temperature of 5° C. in the mixture of the diamine and diglycidyl ether may be achieved by subjecting the mixture as a layer of relatively narrow cross-section, e.g., ¼ inch thickness, in a metal container to a controlled refrigerating atmosphere by which the mixture is quickly cooled to a temperature considerably below 5° C. and then raising the temperature of the mixture to the 5° C. level. A ¼ inch thick layer of the mixture may be quick-chilled in an aluminum metal vessel to about −10° C. in a matter of about 3 to 5 minutes.

A viscous liquid amine-epoxide resin which is curable at elevated temperatures to an elastomeric solid resin is obtained as soon as the cold, partially reacted mixture of the diamine and diglycidyl ether is warmed to room temperature. This liquid resin may be held at room temperature before heat curing to the elastomeric solid for a period of up to about 10 hours.

The viscous liquid amine-epoxide resin is converted to the elastomeric solid amine-epoxide resin by subjecting it to heat at elevated temperature in the range of about 100 to 125° C. and for a period of time of from about 2½ to 4 hours. A preferred temperature and time for this heat curing operation is 110° C. and 3 hours. The heat cured, tough, solid resin is rubber-like in that it will deform and return to shape, although it has a considerably slower rate of recovery than natural rubber. The elastomeric solid resin is essentially a linear polymer as shown by almost complete solubility in dimethyl sulfoxide.

A particular use for the new amine-epoxide resin is as an inherently flexible protective coating on filament-wound, amine-epoxide resin bonded, glass fiber composites. The amine-epoxide resin in the viscous liquid form is brushed on the surface of the filament-wound articles or shapes before heat curing of the bonding resin and the whole then subjected to heat curing at a temperature and for a time as set forth above.

The invention is illustrated by the following specific example of the preparation of an amine-epoxide resin in accordance therewith. Parts are by weight.

EXAMPLE

A solution of N,N'-dimethyethylenediamine in resorcinol diglycidyl ether in stoichiometric proportions is prepared by mixing 4.4 parts of the diamine with 11.1 parts of the diglycidyl ether at room temperature for about 2 minutes in an aluminum metal vessel. The metal vessel containing the mixture is directly placed in a refrigerating atmosphere operating at −10° C. and held there for about 5 minutes to quickly chill the solution to below 5° C., the desired holding temperature for the mixture. The chilled mixture is then held in a refrigerating atmosphere operating at 5° C. for a period of 5 hours after which it is withdrawn from refrigeration and allowed to warm to room temperature to form the liquid viscous amine-epoxide resin.

Since the invention described herein may be variously practiced without departing from the spirit or scope thereof it is intended that the foregoing description shall be taken by way of illustration and not in limitation except as may be required by the appended claims.

What is claimed and desired to be secured by Letters Patent of the United States is:

1. A method of preparing an inherently flexible amine-epoxide resin which comprises mixing N,N'-dimethylethylenediamine and resorcinol diglycidyl ether in proportions to provide an amino hydrogen atom for each epoxy group of the resorcinol diglycidyl ether, cooling the mixture before vigorous reaction therein to cause it to be at a temperature of about 5° C., holding the mixture at said temperature for about 5 hours and subjecting the resulting partially reacted mixture to heat at room temperature to form a viscous liquid resin.

2. A method as defined in claim 1, and heating the viscous liquid resin at an elevated temperature and for a time sufficient to cure it to an elastomeric solid.

3. A method as defined in claim 1, and heating the viscous liquid resin at about 110° C. for a time sufficient to cure it to an elastomeric solid.

4. The viscous liquid resin which is the product of the process of claim 1.

5. The elastomeric solid which is the product of the process of claim 2.

References Cited

UNITED STATES PATENTS

| | | | |
|---|---|---|---|
| 3,151,095 | 9/1964 | Stone | 260—37EP |
| 3,171,870 | 3/1965 | Monteil | 264—28 |
| 2,839,480 | 6/1958 | Heinrich Ott et al. | 260—47EP |
| 2,970,972 | 2/1961 | Wear et al. | 260—47EP |

OTHER REFERENCES

Chemical Abstracts, vol. 61—Plastics Tech. 1964 (p. 13486e).

WILLIAM H. SHORT, Primary Examiner

T. E. PERTILLA, Assistant Examiner

U.S. Cl. X.R.

117—124E, 161UN; 161—185